(12) United States Patent
Bhagwat et al.

(10) Patent No.: US 7,424,544 B2
(45) Date of Patent: Sep. 9, 2008

(54) METHOD FOR IMPROVING PERFORMANCE IN COMPUTER NETWORKS BASED ON LOSSY CHANNEL

(75) Inventors: Rajesh Bhagwat, Fair Oaks, CA (US); Mircea Ouatu-Lascar, Orangeville, CA (US)

(73) Assignee: Cirrus Logic, Inc., Austin, TX (US)

( * ) Notice: Subject to any disclaimer, the term of this patent is extended or adjusted under 35 U.S.C. 154(b) by 1007 days.

(21) Appl. No.: 10/744,204

(22) Filed: Dec. 23, 2003

(65) Prior Publication Data

US 2004/0139213 A1    Jul. 15, 2004

Related U.S. Application Data

(63) Continuation of application No. 09/543,853, filed on Apr. 5, 2000, now Pat. No. 6,742,041.

(51) Int. Cl.
*G06F 15/16* (2006.01)
*G06F 12/00* (2006.01)

(52) U.S. Cl. ...................................... 709/230; 709/203

(58) Field of Classification Search ................. 709/230, 709/232, 203, 224, 228, 220, 250
See application file for complete search history.

(56) References Cited

U.S. PATENT DOCUMENTS

| 5,781,598 | A | 7/1998 | Hardy, III |
| 5,987,504 | A | 11/1999 | Toga |
| 6,338,082 | B1 | 1/2002 | Schneider |
| 6,366,958 | B1 * | 4/2002 | Ainsworth et al. .......... 709/230 |
| 6,463,292 | B1 | 10/2002 | Rahman |
| 6,742,041 | B1 * | 5/2004 | Bhagwat et al. ............. 709/230 |
| 6,985,576 | B1 * | 1/2006 | Huck .................... 379/265.09 |

OTHER PUBLICATIONS

Preston Gralla, 1997 publication; "How the Internet works"; pp. 202-231.
Tom Nolle, 1998 CMPnet; The Technology Network (from Jan. 14, 2000) "Don't let Servers Run Away from You"; http://www.wcmh.com/98/98aug/808c025b.html>; p. 1-4.

* cited by examiner

*Primary Examiner*—Zarni Maung
(74) *Attorney, Agent, or Firm*—James J. Murphy; Thompson & Knight LLP

(57) ABSTRACT

A method and system for improving networking performance in networks based on lossy channels. A selected file system call 109 is redirected by sending a file request to a server over a first protocol. Data is received from the server in response to the file request over a second protocol.

6 Claims, 7 Drawing Sheets

METHOD FOR IMPROVING PERFORMANCE IN COMPUTER NETWORKS BASED ON LOSSY CHANNEL

CROSS REFERENCE TO RELATED APPLICATION

This application is a continuation of U.S. Ser. No. 09/543,853, (now U.S. Pat. No. 6,742,041), issued May 25, 2004, by Bhagwat, et al. entitled "METHOD FOR IMPROVING PERFORMANCE IN COMPUTER NETWORKS BASED ON LOSSY CHANNEL", filed Apr. 5, 2000, and is incorporated herein by reference.

FIELD OF THE INVENTION

The present invention relates to computer networks, and more specifically, to computer networks based on lossy channels.

BACKGROUND OF THE INVENTION

In computer networks, it is necessary for applications to access files located on network servers. When an application tries to access a file over a network, a file system call 109 is sent by the application, which resides in a client, to a network server. Microsoft® (MS) networks have components at the file system level. Microsoft® also has proprietary protocols at the file system level to help get the files over the network. Protocols define how computers identify one another on a network, the format by which the data is sent, how the data should be processed once it reaches its final destination and procedures for handling lost or damaged transmissions or "packets."

File system calls, in MS-networks, go through an installable file system manager (IFSMGR), a Microsoft® component. The IFSMGR handles all calls from all of the applications—including 32 bit, 16 bit, and DOS applications. Multiple file system providers may be installed on the system. One file system provider is a default file system provider, which is a Microsoft® network redirector. Each call is routed by the IFSMGR to the MS-network redirector, which constructs a network request and sends the request over the network. The MS-network redirector also encodes requests and decodes responses. The MS-network redirector works serially, which means that the redirector will send one request, wait for a response, and once it receives the response sends the next request. This system of processing file system calls is synchronous with application requests as well. In synchronous communications, each party is required to wait a specified interval before speaking—in contrast to asynchronous communications where both parties can talk whenever they like.

Microsoft® uses a Server Message Block (SMB) protocol. SMB is a message format used by DOS and Windows to share files, directories and services. The MS-network redirector encodes the file system request into SMB format and sends it through Network Basic Input Output System (NetBIOS) on Transmission Control Protocol/Internet Protocol (TCP/IP). NetBIOS is an application programming interface that augments DOSBIOS by adding special functions for Local Area Networks (LANs). Thus, the actual transfer of data is done over TCP/IP.

A characteristic of TCP/IP is that every TCP packet must be acknowledged, which creates traffic in the reverse direction. In protocols having slotted architecture, each slot may have two nodes, node A and node B, such that when node A is transmitting, node B is receiving and vice versa. Therefore, when TCP/IP is used to transmit data, some bandwidth must be allocated in the slot for the reverse channel to accommodate the traffic in the reverse direction, which lowers the amount of bandwidth that can be allocated for the forward channel.

Thus, network performance is lowered by the requirement of bandwidth for a backward channel and the system of processing file system calls being synchronous with application requests.

SUMMARY OF THE INVENTION

A method and system for improving networking performance in networks based on lossy channels are described. In one embodiment, a selected file system call 109 is redirected by sending a file request to a server over a first protocol. Data is received from the server in response to the file request over a second protocol.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
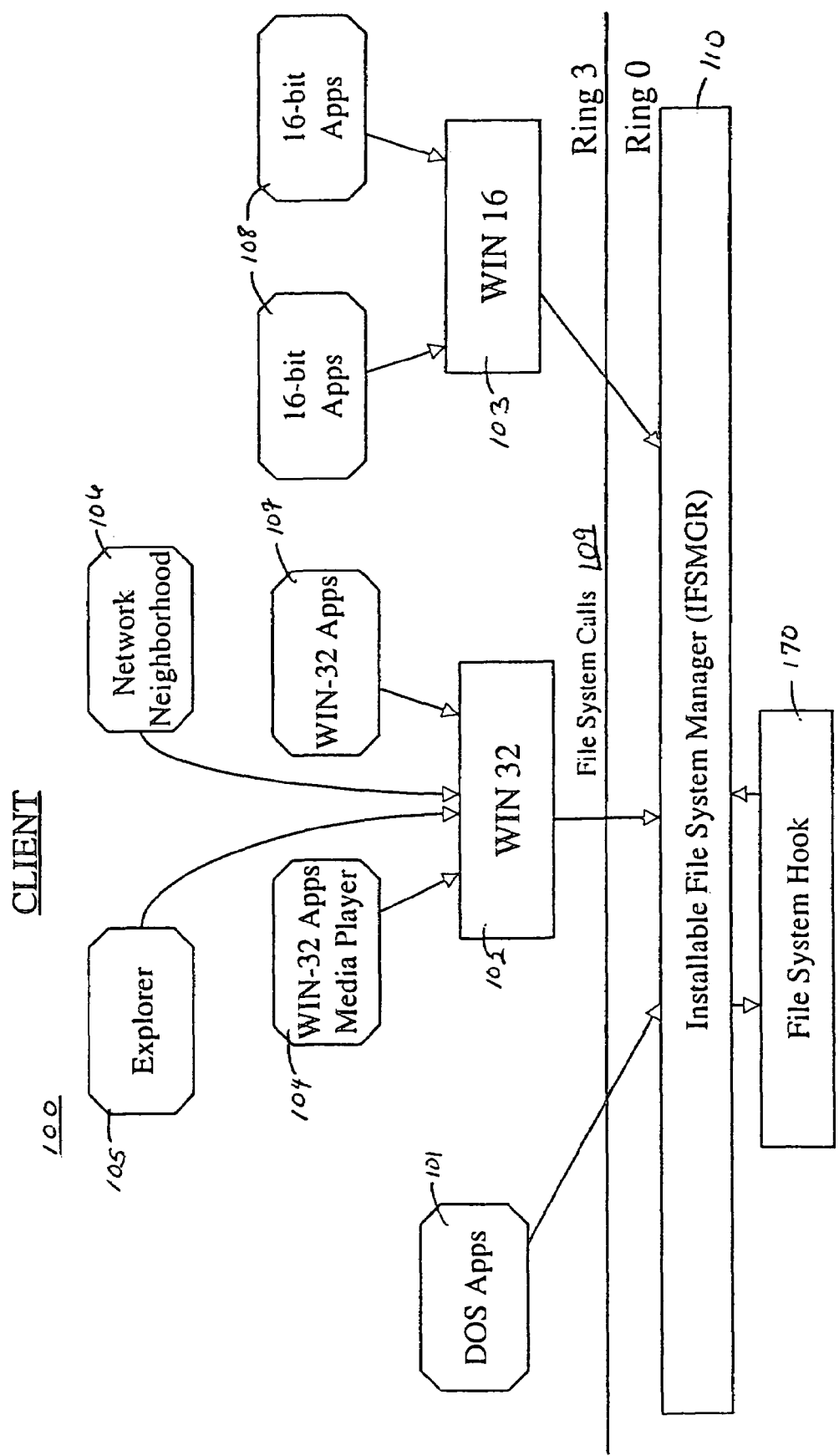
FIG. 1 is a system architecture of one embodiment of a client having improved networking performance in networks based on lossy channels.

A method and system for improved networking performance in networks based on lossy channels are described. In one embodiment, a selected file system call 109 is redirected by sending a file request to a server over a first protocol. Data is received from the server in response to the file request over a second protocol.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
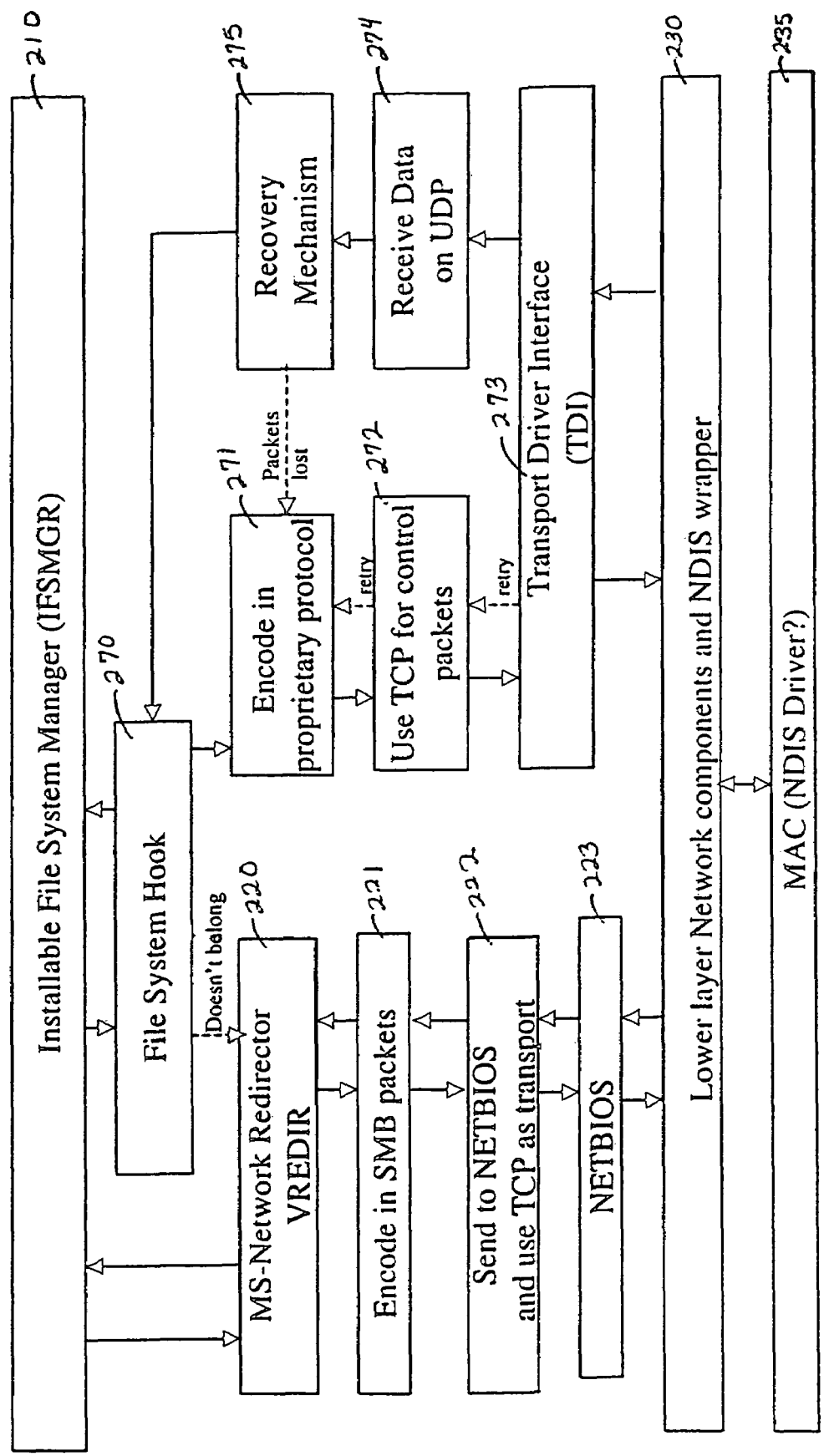
FIG. 2 is a block diagram one embodiment of an improved networking performance system in the client of FIG. 1.

FIGS. 1 and 2 illustrate an improved networking performance system for a client of a network. Client 100 includes a variety of applications and an installable file system manager 110. The applications may include, for example, DOS applications 101, Windows® 32 bit applications 102—such as media player 104, internet explorer 105, network neighborhood 106, and other Windows® 32 bit applications 107, and Windows® 16 bit applications 103 including 16 bit applications 108. File system calls 109 from the various applications 101, 102 and 103 are sent to the installable file system manager (IFSMGR) 110. The IFSMGR is connected to a file system hook 170, as shown in FIG. 1.

As shown in FIG. 2, the file system hook 270 sits between the IFSMGR 210 and network redirector 220, which is a Microsoft® network redirector, in this case. In FIG. 2, the file system hook 270 checks to see if the file call 109 should be passed on to the Microsoft® network redirector 220 or redirected to a compliant server (not shown). A compliant server is one that is configured to interact with the file system hook 270 according to the present invention, as described below, for example with regard to FIGS. 3 and 5.

When the IFSMGR transmits the file system call 109, file system hook 270 intercepts the file system call 109 before it is forwarded to the MS network redirector 220. The file system hook 270 then determines if there is a compliant server to which the file system call 109 is directed. The file system hook 270 also determines whether the file system call 109 is for a read file request.

If the file system call 109 is not a read file request or if the file system call 109 is not directed to a compliant server, the file system call 109 is passed on to the Microsoft® redirector 220. The MS redirector 220 then encodes the file system call 109 in server message block in block 221, and sends the encoded packet to NETBIOS using TCP as a transport protocol in block 222. The NETBIOS 223 sends the encoded file system call to the lower layer network components and Network Device Interface Specification (NDIS) wrapper 230. The lower layer network components and NDIS wrapper interfaces with the media access control layer 235.

However, if the file system call 109 is a read file request and a compliant server is present, the file system hook sends the file system call 109 to be encoded in a proprietary protocol in block 271. The file system call 109 is sent as a control packet encoded in TCP in block 272. The control packet is sent to transport driver interface (TDI) 273. The TDI sends the control packet to the lower layer network components and NDIS wrapper 230 and MAC (NDIS driver) 235. The TDI receives data from the lower layer network components and forwards the data it receives in block 274. The data is received in block 274 on user datagram protocol (UDP). UDP does not require acknowledgment for data sent. If there are any lost packets, the client performs a recovery mechanism in block 275. Because the client receives the data on UDP, the client does not need to send an acknowledgement (ACK) for each data packet sent. Thus, it is possible to maximize the bandwidth for the forward channel and minimize the backward channel.

Figure 6A:
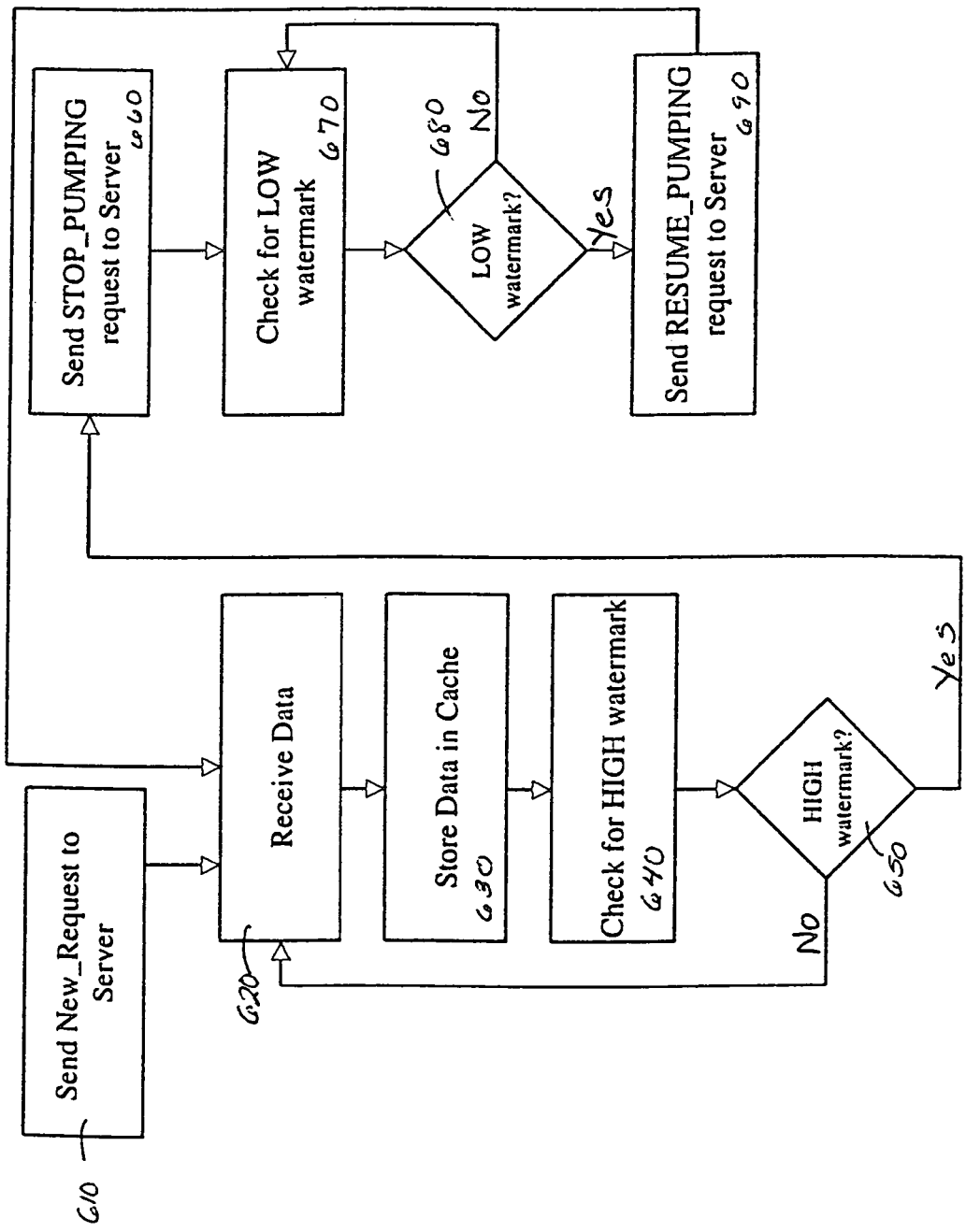
FIG. 6A is a flow diagram of another embodiment of an improved networking performance system in a network client.

The client 100 also includes a cache (not shown) for storing read-ahead data, as illustrated in 6A and 6B. In FIG. 6A, a client sends a request, in step 610, to a server to indicate a new file transfer. In step 620, the client begins receiving data and stores the data in a cache in step 630. At the same time, applications will consume the data at the rate at which the applications require the data. The client will check if the cache is reaching full capacity by checking for a first particular level, or HIGH watermark. If the client decides, in step 650, that the cache has reached the HIGH watermark, the client will send a STOP_PUMPING request to the server in step 660, or else the client will continue to receive data in step 620. If the client sends the STOP_PUMPING request, the server will stop sending data. The applications will continue to consume the data, and the client will check, in step 670, if enough data has been consumed that a second particular level, or a LOW watermark, has been reached. If the client decides, in step 670, that the LOW watermark has been reached, it will send a RESUME_PUMPING request to the server in step 690, or else the client will continue to check for a low watermark in step 670. If the client sends a RESUME_PUMPING request in step 690, the client will continue to receive data in step 620, and continue repeating the steps in FIG. 6A as necessary until all the data has been received.

Figure 6B:
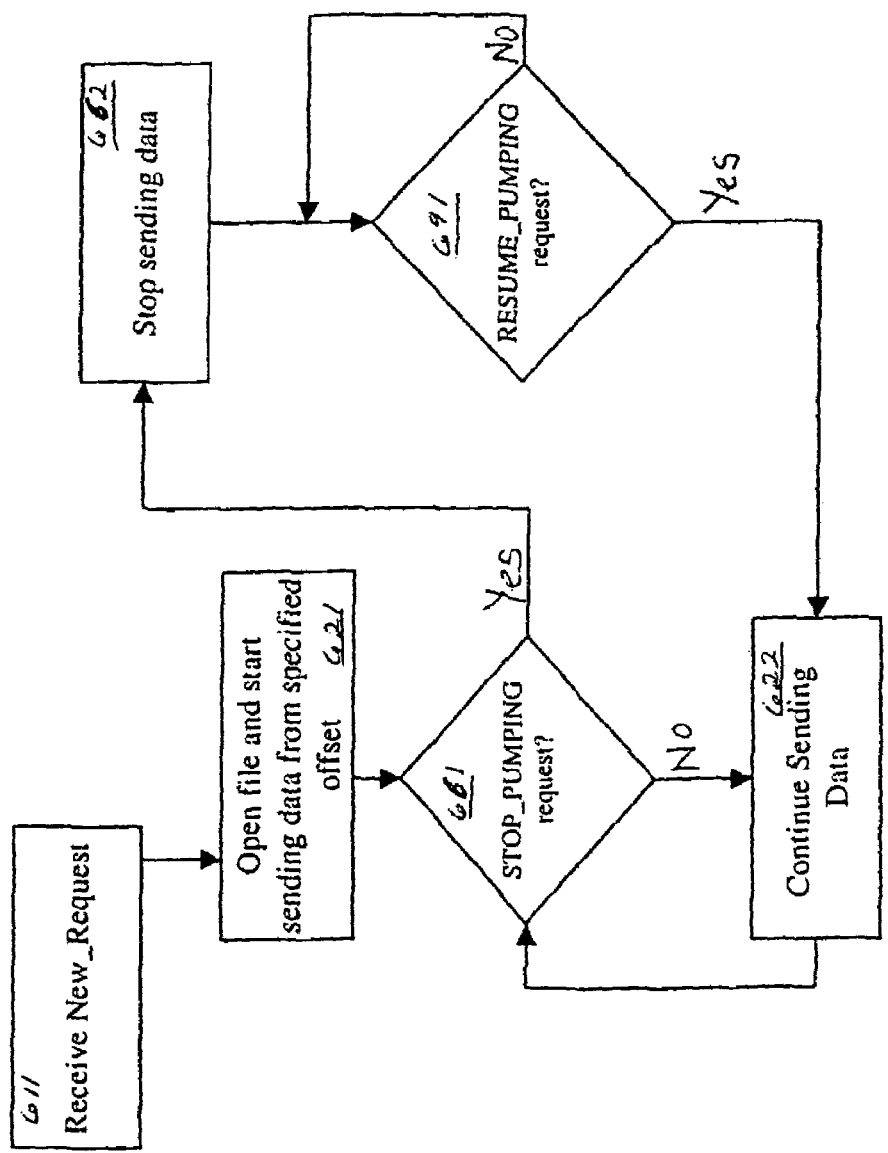
FIG. 6B is a flow diagram of another embodiment of an improved networking performance system in a network server.

FIG. 6B illustrates a server that is compliant with the client of FIG. 6A. The server receives a New_Request in step 611. The server opens the requested file and starts sending data from a specified offset in step 621. If the server receives a STOP_PUMPING request in step 661, it will stop sending data in step 661, or else the server will continue sending data in step 622. If the server receives a STOP_PUMPING request and stops sending data in step 661, the server will check if a RESUME_PUMPING request has been sent in step 691. If a RESUME_PUMPING request has been received, the server will continue sending data in step 622, or else the server will continue checking for a RESUME_PUMPING request in step 691. The server will repeat the steps of FIG. 6B as necessary until all the data has been sent.

Thus, the server may send data at a faster rate than the application requesting it can consume it. Thus, if an application is consuming data at a low rate, the network performance will not be lowered by the server sending data at the same low rate. The cache will continue storing data until the cache starts reaching full capacity.

Figure 3:
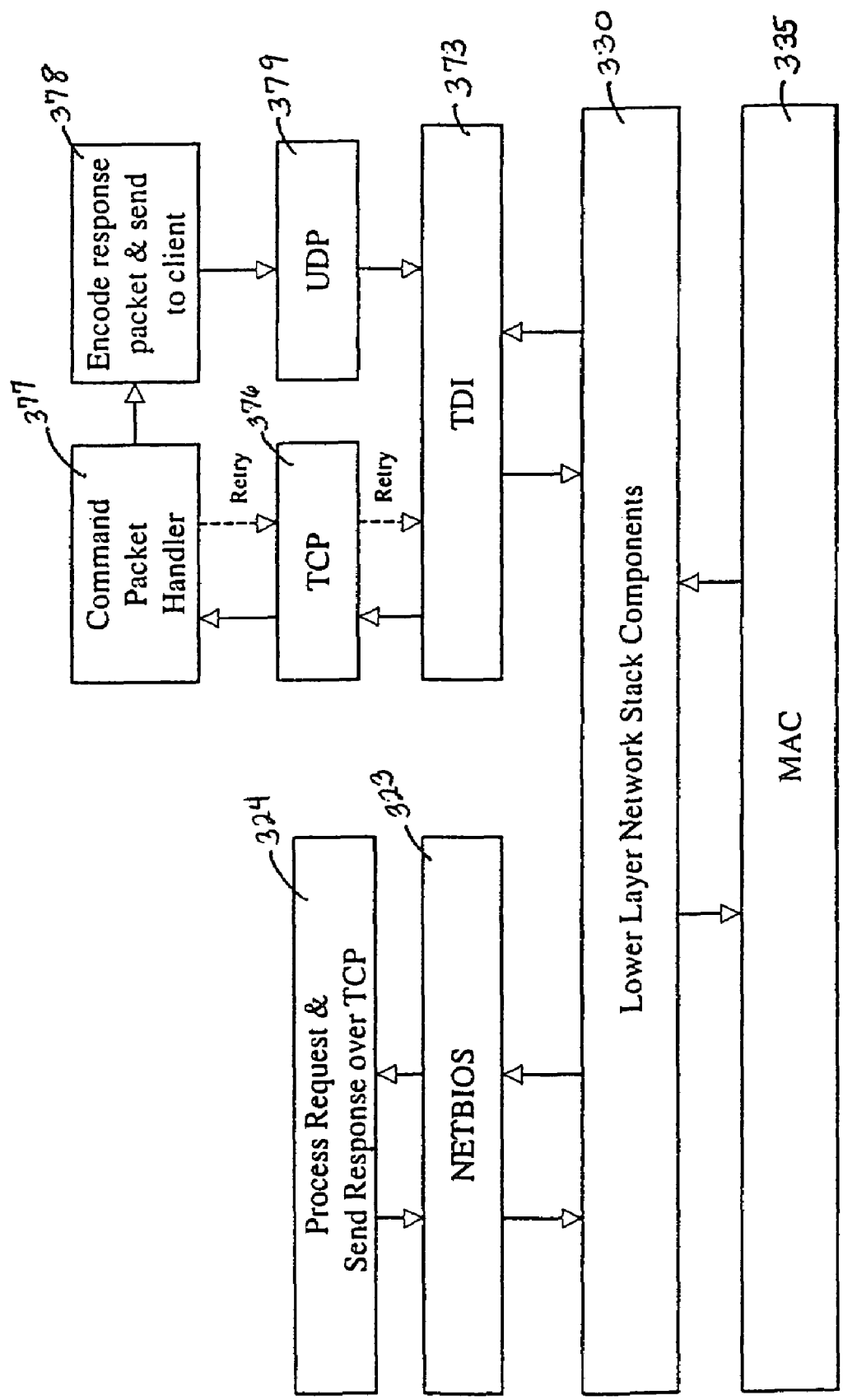
FIG. 3 is a block diagram of one embodiment an improved networking performance system of a server.

FIG. 3 shows a block diagram of one embodiment of a server and its improved networking performance system. When the lower layer network components 330 receive a network request through NETBIOS 323, the server processes the request and sends the response over the transmission control protocol (TCP) in block 324. However, if the lower layer network stack components 330 receives a file request from the file system hook 270 (in FIG. 2) through TDI 373, the TDI 373 sends the command packet through TCP in block 376 to the command packet handler in block 377. The common packet handler encodes the response packet and sends it to the client in block 378 over UDP in block 379. As discussed with regard in FIG. 2, the client receives the data.

Figure 4:
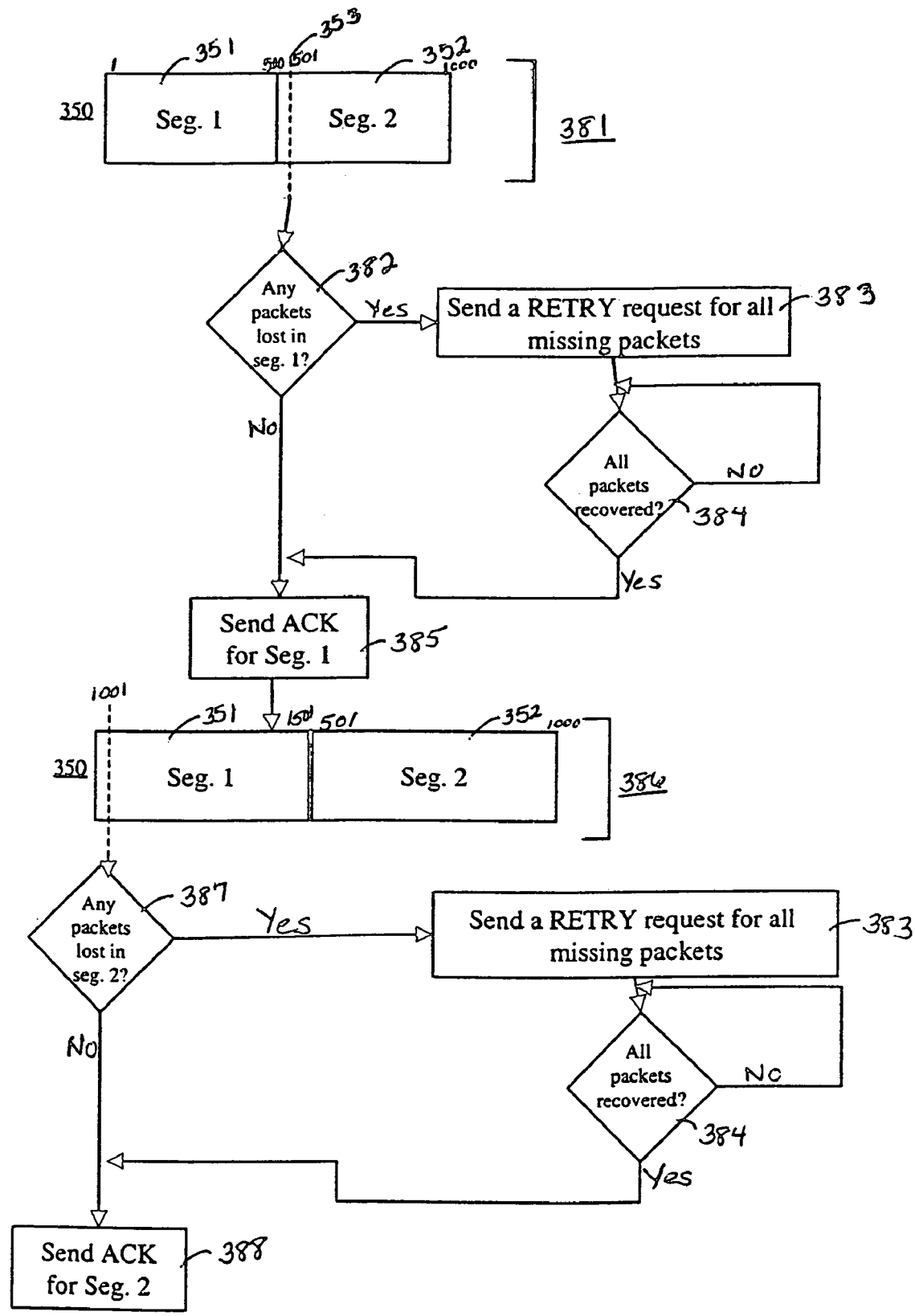
FIG. 4 is a flow diagram of one embodiment of a recovery mechanism for an improved networking performance system in a client.
Figure 5:
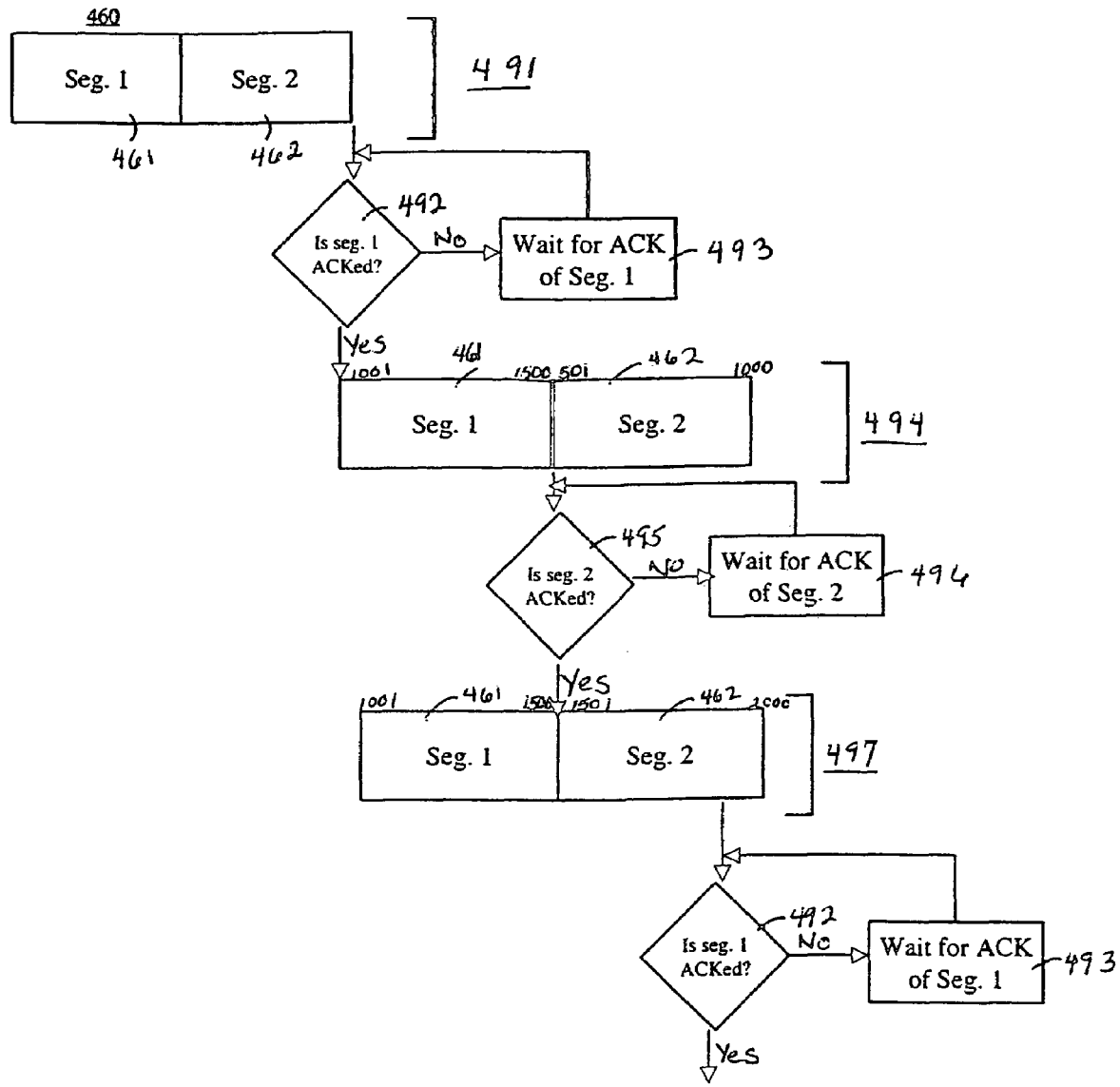
FIG. 5 is a flow diagram of one embodiment of a recovery mechanism for an improved networking performance system in a server.

Another aspect of the improved performance is the recovery mechanism, as illustrated in FIGS. 4 and 5. FIG. 4 shows the client recovery mechanism. The client maintains packet window 350, which is split into two segments 351 and 352 by a threshold value. The window may have a size of, for example, 1,000 packets and the threshold may be 500 packets. Thus, the first segment 351 will contain packets 1 to 500 and the second segment 352, will contain packets 501 to 1,000. Thus in step 381 of FIG. 4, the client receives packets through, for example, UDP. When the window has crossed the threshold of 500 packets, for example, to 501 packets in step 382, the client will check to see if any packets have been lost in the first segment 351. If packets have been lost, the client will send a retry request in step 383 to the server for all the missing packets. Thus, with regard to FIG. 2, in block 275 the recovery mechanism will send a request to block 274 to encode the retry request in the proprietary protocol. The proprietary protocol is TCP for control packets, which will be encoded in block 272. The retry request will be transmitted by the server through TDI 373. TDI 373 will send the retry request through TCP in block 376 to the command packet handler 377.

The command packet handler will send the retry request through TCP this time in block 376 through TDI 373 to the client. The client will receive the packet over TCP in block 272, which it will send through block 274 to the file system hook 270. The client will then check to see if all the packets have been recovered in step 384 of FIG. 3. If not all the packets have been recovered the client will send a retry request through step 373 of FIG. 3.

Once all the packets have been recovered, or if no packets had been lost, as determined in step 382, the client will send an ACK signal for the first segment 351 in step 385. Then, the client will forward the window by the threshold amount in step 386 such that the first segment will contain packets 1,001 to 1500, for example, and the second segment will contain packets 501 to 1,000. The client will then, after the new threshold, for example, 1,000 has been crossed, examine if any packets are missing in the second segment 352 in step 387. If any packets are missing, the client will perform step 383 and 384 as needed until all the packets have been recovered.

The server, as illustrated in FIG. 5, maintains a packet window 460 similar to that of the client and having the same packet size and threshold value. The server packet window 460 is also split into two segments, segment one 461 and segment two 462. In step 491, the server starts sending the packets of data over UDP. When the server reaches 1,000 packets, for example, or the end of the window, the server checks, in step 492, to see if an acknowledgement (ACK) has been received for the first segment 461 of the data sent over UDP. If no ACK has been received for the first segment 461, then in step 493, the server will wait for an ACK to arrive. The server will continue to check for an ACK in step 492 until one has been received.

Once the ACK signal has been received the server will advance the packet window by the threshold amount. In this case, the threshold amount is 500 packets, so that the first segment 461 will contain packets 1,001 to 1500 of the data to be transmitted. The server will also advance the window threshold by the threshold amount so that the new window threshold is 1,000 (or 500+500). Once the new window threshold of 1,000 has been crossed, the server will check if the second segment has been acknowledged in step 495. If the second segment has not been acknowledged, the server will wait in step 496 for an ACK for the second segment 462. The server will continually check for an ACK, and in step 495, once an ACK has been received, the server will again advance the window by the threshold amount and advance the window threshold by the threshold amount such that the new window threshold will be 1500 in step 497.

Once packets 1501 to 2,000 have been sent, the server will check in step 492 if the first segment 461 has been acknowledged. If the first segment has not been acknowledged, the server will wait in step 493 for the ACK for the first segment to be received, as described above. The server will continue to send packets and ensure that ACKs for each segment have been received until all the packets have been sent.

Because the underlying MAC protocol 235, takes care of reliable data transfer, the RETRY commands will not be used frequently, thus increasing the network performance. In case of RETRY, an ACK is sent after all the packets are recovered on the TCP channel.

Whereas many alterations and modifications of the present invention will no doubt become apparent to a person of ordinary skill in the art after having read the forgoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

We claim:

1. A method of handling requests in a network system, comprising:

determining if a file system call by a client is a forward channel file request and whether a compliant server is present; and if the file system call is a forward channel call request and a compliant server is present, sending by the compliant server data based on the forward channel file request through a forward channel data protocol to the client.

2. The method of claim 1 wherein the forward channel file request is a read file request.

3. The method of claim 1 wherein the forward channel data protocol is a user datagram protocol.

4. The method of claim 1 wherein the method of handling requests is performed at a data-link layer.

5. The method of claim 4 wherein the data-link layer is a MAC layer.

6. The method of claim 1 further comprising recovering lost compliant server data sent through the forward channel.

* * * * *